US007469872B2

(12) United States Patent
Compagnone et al.

(10) Patent No.: US 7,469,872 B2
(45) Date of Patent: Dec. 30, 2008

(54) DEVICE FOR POSITIONING AND ASSEMBLING SUCCESSIVE FRAMES

(75) Inventors: Giovanni Compagnone, Crissier (CH); Alvise Cavallari, Vufflens-la-Ville (CH)

(73) Assignee: Bobst S.A. (CH)

( * ) Notice: Subject to any disclaimer, the term of this patent is extended or adjusted under 35 U.S.C. 154(b) by 309 days.

(21) Appl. No.: 11/105,982

(22) Filed: Apr. 14, 2005

(65) Prior Publication Data

US 2005/0247017 A1 Nov. 10, 2005

(30) Foreign Application Priority Data

Apr. 20, 2004 (CH) .................. 0685/04

(51) Int. Cl.
*F16M 11/00* (2006.01)
*F16M 11/24* (2006.01)
*E02D 27/44* (2006.01)

(52) U.S. Cl. .................. 248/639; 248/188.2; 248/677; 248/678

(58) Field of Classification Search ........... 248/677, 248/645, 673, 644; 108/64, 59, 63
See application file for complete search history.

(56) References Cited

U.S. PATENT DOCUMENTS

| | | | | | |
|---|---|---|---|---|---|
| 1,970,705 | A | * | 8/1934 | Montigney | 410/31 |
| 2,294,855 | A | * | 9/1942 | Thomason | 248/544 |
| 2,828,931 | A | * | 4/1958 | Harvey | 410/46 |
| 3,978,574 | A | * | 9/1976 | Stith, Jr. | 52/745.21 |
| 4,626,299 | A | * | 12/1986 | Knight et al. | 156/71 |
| 4,758,945 | A | * | 7/1988 | Remedi | 713/322 |
| 5,501,421 | A | * | 3/1996 | Kluting | 248/288.31 |
| 5,826,336 | A | * | 10/1998 | Schmitz | 29/890.124 |
| 5,890,696 | A | * | 4/1999 | Ozawa | 248/677 |
| 5,950,295 | A | * | 9/1999 | Worden et al. | 29/423 |
| 6,257,544 | B1 | * | 7/2001 | Schultz | 248/678 |
| 6,272,728 | B1 | * | 8/2001 | Lenac et al. | 29/458 |
| 6,668,441 | B1 | * | 12/2003 | Gudaitis et al. | 29/458 |

FOREIGN PATENT DOCUMENTS

| | | | |
|---|---|---|---|
| CH | 00685/04 | * | 4/2004 |
| DE | 100 17 507 | * | 10/2001 |
| EP | 0 687 559 | | 12/1995 |
| EP | 0 687559 | * | 12/1995 |

OTHER PUBLICATIONS

European Search Report for EP 04 40 5244 dated Sep. 8, 2004.*

* cited by examiner

*Primary Examiner*—Anita M King
(74) *Attorney, Agent, or Firm*—Ostrolenk, Faber, Gerb & Soffen, LLP

(57) ABSTRACT

A device for positioning and assembling successive frames in a machine of a production line. The device is intended in particular for relative positioning of two adjacent frames, namely an upstream frame and a downstream frame. At least one link connects the upstream frame to the downstream frame and supports the upstream part of the downstream frame. The link comprises a cylinder that extends across the successive frames and is received in a bearing at each of the adjacent frames. A tightenable tension rod locks the selected relative positions of the successive frames.

16 Claims, 2 Drawing Sheets

DEVICE FOR POSITIONING AND ASSEMBLING SUCCESSIVE FRAMES

The present invention refers to a device for positioning and assembling successive frames, constituting a production line machine, wherein the device is used in particular for the relative positioning of two adjacent frames.

Such machines composed of several successive frames are commonly used in the field of the packaging and printing industry, in particular for cardboard boxes converting and manufacturing. One will however note that many production lines related to quite different technical fields also require using machines comprised of a plurality of units assembled and arranged one after another. Said units can be stations in which various successive operations are carried out, aiming to production, modification or conditioning of a product from its upstream infeed to its downstream delivery.

In order to describe practically the problem intended to be solved by the object of the present invention, a rotary printing machine comprising several printing units will be taken as an example of a production machine. Color printing of a cardboard sheet or a web material can be reached from a printing line including at least three or four printing units. Each unit deposits a primary color, namely the yellow, cyan and magenta for a three-color printing.

Superimposing said colors enables, through many schemes and intensities obtaining all natural tints. However, in order to obtain a quality printing, it is necessary to reach a perfect superimposition of the successive prints printed by each printing unit. In order to reach said goal in the near future, one of the main objective consists in positioning the frames of each unit the one related to another, in order to obtain, for example, as perfect alignment as possible.

Such frames are usually equipped with four feet, each one arranged at a base plate angle. Said feet are mounted on threaded rods so that they can be adjustable in their height independently the one another. Thanks to such a system, it possible to make the travelling plan of the sheet or the web material of the printing group entirely horizontal, when compensating, if necessary, surface evenness faults on which lays said printing unit.

The different printing units are methodically positioned in line, starting from the last one. Said positioning aims to achieve for each printing unit a travelling plan perfectly horizontal and aligned with respect to the travelling plans of the upstream and downstream adjacent units. To perform the method, one uses a tended wire between one end and the other of the production line, used as a linear reference for the lateral and angular alignment of the different frames as well as a horizontal reference line. One also uses an air level, a compass equipped with a comparator as well as space bars.

Alignment operations are the following:

One will first of all arrange the last frame parallel to the wire, at a certain distance from the latter. One will set the transverse level of the frame by means of an air level arranged on an anvil roller of said printing unit. One will then set the longitudinal level of each frame side. The perpendicularity of the frame with respect to the tended wire will be set by means of the compass and the comparator. To perform the method, the one end compass is fastened at the bottom of the frame into a boring with tight tolerance provided upstream of the printing unit. A comparator arranged at its second end enables reading a value related to the surface, which will then be compared to a second one measured after a half-turn swiveling of the compass. The differences registered on the comparator will be corrected using screws equipping the frame feet. After successive stages, one should reach a perfect perpendicularity of the printing unit.

It is then advisable to settle the adjacent printing unit frame parallel to the tended wire, at the same distance from than previously. The second printing unit will be set according to the previous one that has been just set up. For that purpose, one will use a precision ruler provided with a level that will be longitudinally laid on against the anvil rollers of both printing units. Said operation will allow to set the height of the second printing unit compared to the previous one. It will be advisable to also set the space between both printing units, which must be precise and constant for all units. Said operation requires using reference space bars.

Once said settings of the second printing unit are achieved, it is still advisable to check the perpendicularity of said second unit with respect to the horizontality of the tended wire. Said control is achieved using the compass and the comparator, like before. If the result should not be satisfactory, it would then be advisable to remove the space bars and correct the perpendicularity error. The levels will then have to be rechecked.

After said operations, it will still be necessary to deal also with all other printing units. With four-color processes and/or printings using special inks, such as silver or gold, it would be necessary to position not less than four, five or six printing units. The positioning of other frames supporting stations needed for the functioning of such a printing line is also to be taken into account. Among said stations, one will quote as example the infeed station, the various intercalary drying stations, the delivery station, etc. . . . Moreover, it can happen that a production line intended for printing is directly followed by a line for converting the printed material. One realizes that such machines or machine embodiments can own a huge amount of stations for which each frame must be accurately positioned with one another.

The time required for such a frame alignment is the main drawback of up-to-date methods. Said duration delays the putting into operation of the production line and increases also the machines installation cost.

The object of the present invention is to obviate the above drawbacks by proposing a device enabling to simplify the positioning of the successive frames constituting a machine before its assembly. Moreover, said device should be of simple realization in order to benefit of a low cost price and to lower as much as possible the global cost involved by the installation of such a machine. The object of the invention must also be implemented without requiring subsequent changes of the frame positioning. Lastly, the device of the invention should not be limited to the positioning and assembling of frames according only to a rectilinear alignment, but should also be entirely satisfactory when installing a curved production line, for example at right angle.

These aims are reached owing to the present invention related to a device for positioning and assembling successive frames, in particular for positioning frames constituting a production machine, according to claim 1.

The invention will be more clearly understood from the study of a preferred embodiment given by way of non-limitative example and illustrated by the accompanying drawings, in which.

Figure 1:
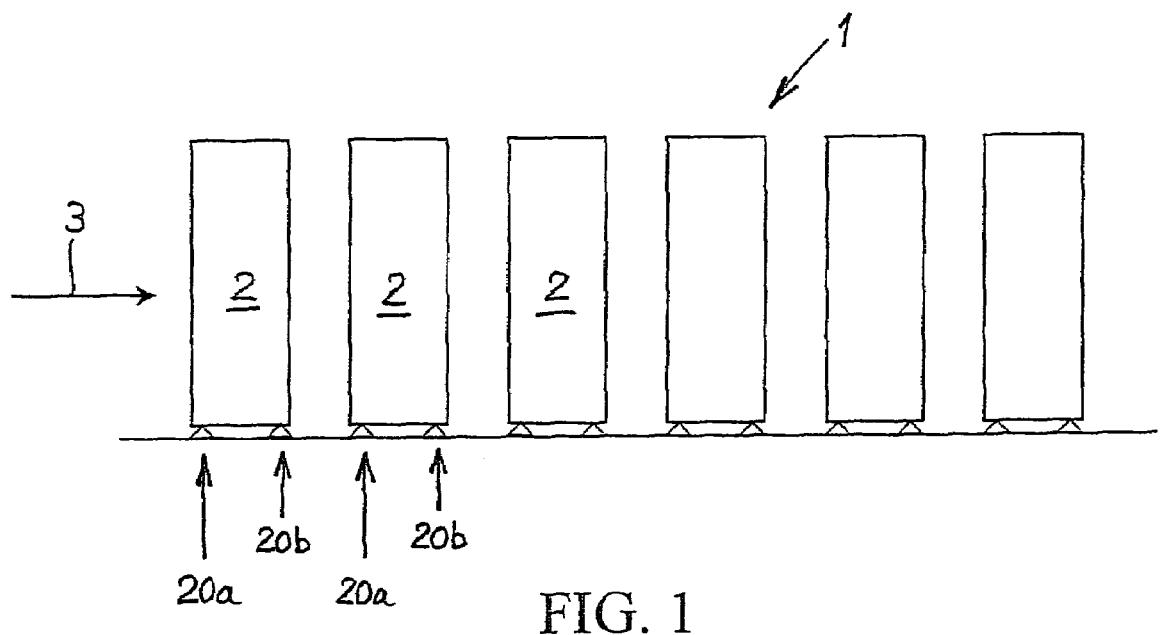
FIG. 1 is a diagrammatic view of a machine comprising several frames.

FIG. 1 is a diagrammatic view of a machine 1 on a production line comprising a plurality of frames 2 successively arranged the one after another. Each said frame 2 is intended for supporting a station or a working unit in which at least one production line operation (not represented) is achieved on a product. Said operations are methodically carried out, from upstream to downstream, as shown by arrow 3. Such stations could each be a printing unit of a printing machine for example. Said operations could then relate to the different primary colors printing used for proceeding to a color print of a web or sheet material.

Figure 2:
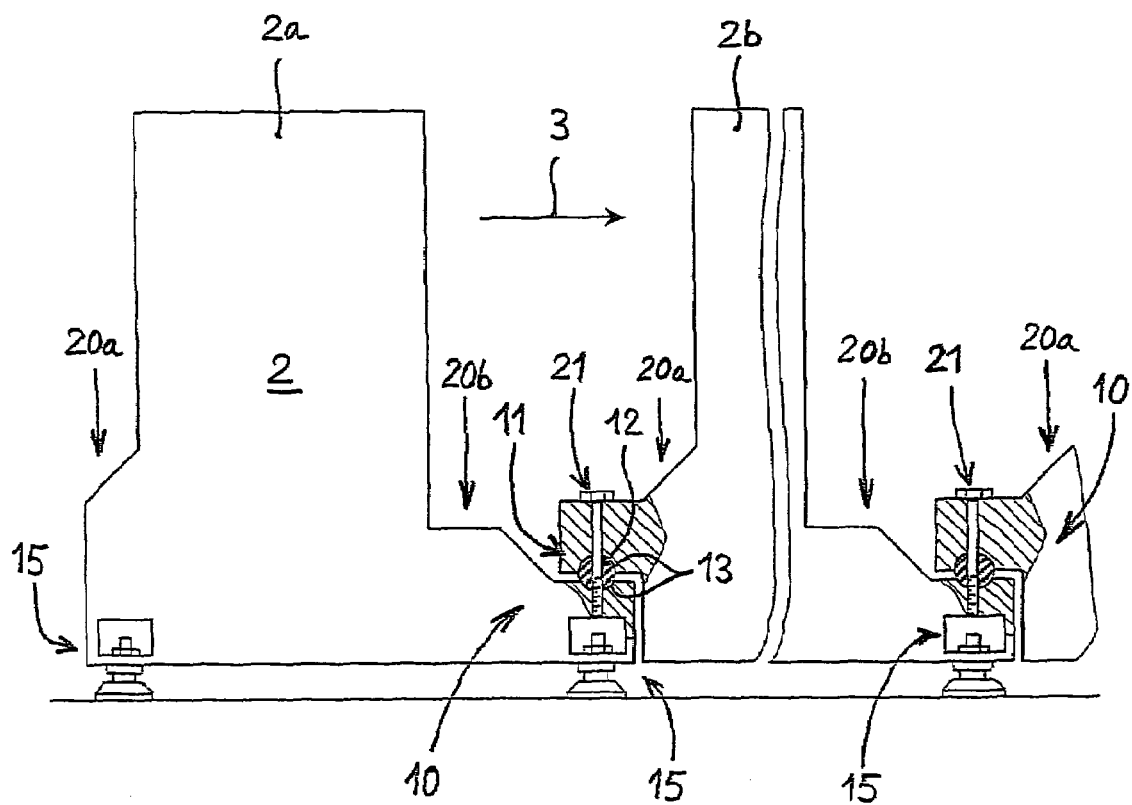
FIG. 2 is a diagrammatic view of a machine part whose different frames are assembled and positioned owning to the device of the invention.

FIG. 2 is a more detailed diagrammatic view of a portion of machine 1, showing the positioning and assembling per pairs of three successive frames 2, by means of a device 10, object of the present invention. Thus, the device 10 for positioning and assembling is always arranged at the junction of two adjacent frames 2, being here an upstream frame 2a and a downstream frame 2b. It will thus be advisable to forecast n-1 device 10 for positioning and assembling n frames constituting a machine 1. For simplification reasons, only the first frame is entirely illustrated on FIG. 2; the next two being only partly represented.

According to FIG. 2, the upstream frame 2a is related to the first frame 2 according to the direction of arrow 3. Still according to said arrow, the downstream frame 2b is thus related to the adjacent frame following the upstream frame 2a, i.e. in this example, the second frame 2. With an aim to generalize the various alternatives, one should understand that the upstream frame 2a could also be any unspecified frame 2 of machine 1, except the last one.

The device 10 comprises one link 11 connecting the upstream frame 2a to the downstream frame 2b. The link 11 is arranged in the downstream part 20b of the upstream frame 2a and supports the upstream part 20a of the downstream frame 2b. Said link is preferably constituted by a cylinder 12 fixedly attached into bearings 13. The latter are advantageously located at both ends of the cylinder 12. However, it could be also possible to add one or several intermediate bearings intended to jointly support the cylinder 12 weight as well as the upstream part 20a of the downstream frame 2b weight. According to another embodiment, it could also be possible to forecast a continuous support against the whole length of the cylinder.

The link 11 is preferably arranged on the bisectrix of an angle issued from two adjacent frames 2, namely the horizontal angle formed by the upstream frame 2a and the downstream frame 2b.

The frames 2 are usually rectilinearly positioned, so that the link is here perpendicularly arranged with respect to the alignment. It can however happen that frames 2 of machine 1 are not all aligned according only to a main longitudinal axis, but are curved at right angles, for example. Such an installation will essentially depend on the arrangement possibilities provided by machine 1 as well as on the available space for its installation.

With another realization way, it could be possible to arrange for several links 11, for example one on each side of frames 2. Those links could thus be spherically shaped, like a swivel rather than cylindrically.

Figure 3:
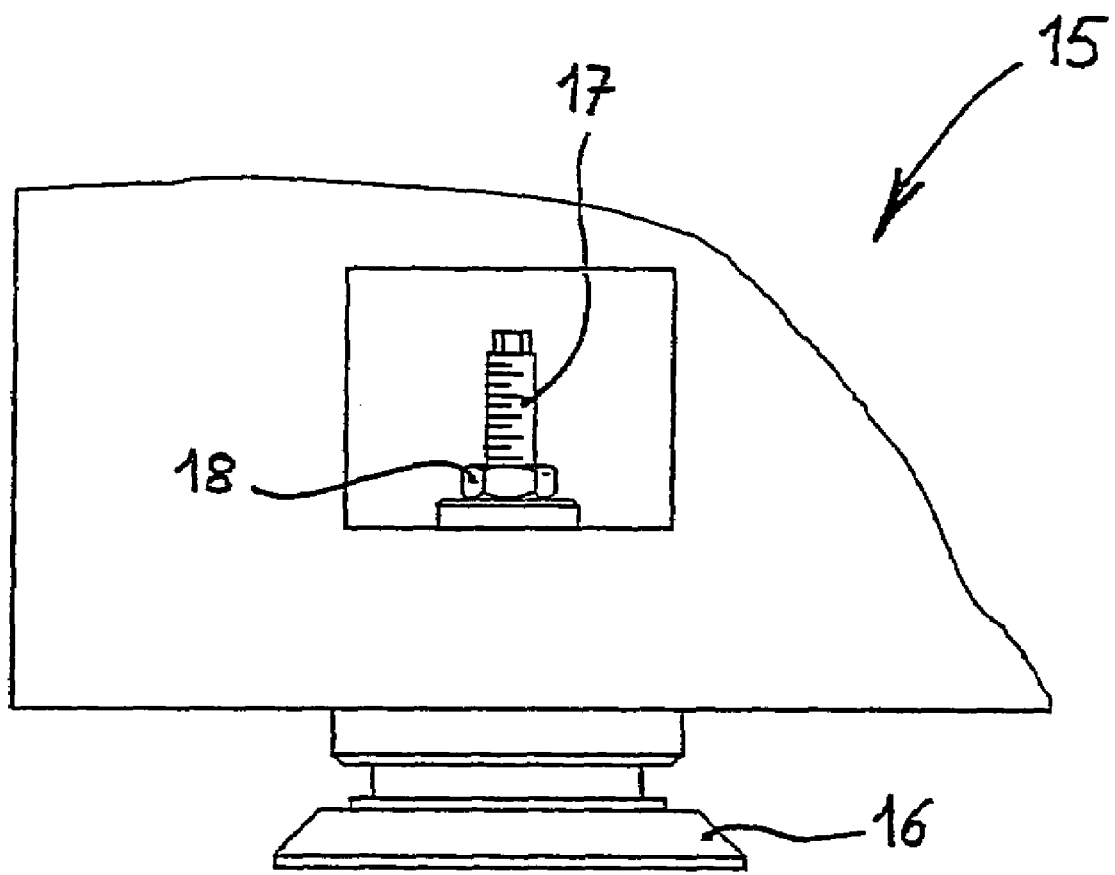
FIG. 3 is a detail of a part of FIG. 2.

The detail of one base supports 15 used for supporting the frames 2 is shown on FIG. 3. Said supports are constituted by a foot 16 ended by a threaded rod 17 entering a tapping spared within the frame 2. Each support 15 is thus adjustable in height and can be tightened in said position thanks to a not 18. A graduated ruler is connected, if necessary, to each support 15 enabling thus an easier setting. An alternative could consist in mounting the foot 16 on a swivel, not shown, so that the latter can fit as well as possible the surface flatness conditions.

Referring to FIG. 2, one notes that the link 11 is preferably located in the vertical plan entering the support 15, more precisely through the longitudinal axis of the threaded rod 17. The load of link 11 is thus advantageously directly transmitted on supports 15 being vertically arranged on each side of the upstream frame 2a.

The device 10 of the present invention advantageously enables each frame 2, except the first one, to be mounted on two supports 15 namely in its downstream part 20b and on a link 11 in its upstream part 20a. Only the first frame of FIG. 2 left side will be preferably mounted on four supports 15 arranged at its angles.

Thanks to the object of the invention, the leveling of the downstream frame, through the setting of the supports 15 of its downstream part 20b, remains possible when one has to position said frame with respect to the previous upstream frame 2a. Thanks to link 11, the downstream frame 2b is freely moved with only one degree, i.e. for swiveling in a vertical plane around the link 11 located in its upstream part 20a. Any angular swiveling in the horizontal plane is thus impossible because of the cylinder 12 being fixedly attached to bearings 13. Once the leveling is over, one will have to maintain said constant level by locking each upstream 2a and downstream 2b frame positions. Said locking of the frames 2a and 2b is achieved by means of a tension rod 21. Said tension rod 21 crosses the upstream part 20a of the downstream frame 2b as well as the cylinder 12 and comes to be screwed into the downstream part 20b of the upstream frame 2a. The complete tightening of the tension rod 21 will enable fixedly attach the two frames 2a and 2b and to maintain thus the previous leveling. A air level is the only additional tool to be used for achieving the supports 15 settings. It should thus be envisaged to add such a tool to the frames, i.e. relatively positioned.

Aligning and leveling the downstream frame 2b is thus much easier. Indeed, to carry on said operations, a reference line, materialized for example by a tended wire is of no use right now. It is also not necessary anymore to use neither a compass nor a comparator. Moreover, spacing bars, previously used for spacing two adjacent frames, are thus advantageously one of said accessories useless for perfectly achieving a correct positioning.

And lastly, such a device 10 provided within a frame 2 is also advantageously not to be considered as an expansive installation regarding saving time at the time of machine 1 installation.

Numerous improvements can be applied to the device of the present invention within the scope of the claims.

What is claimed is:

1. Device for positioning and assembling successive frames of a machine of a production line and for relatively positioning two adjacent frames, comprising:
   an upstream frame;
   a downstream frame located downstream of the upstream frame, the downstream frame having an upstream part extending substantially perpendicularly to the downstream frame towards the upstream frame and the upstream frame having a downstream part extending towards the downstream frame;
   at least one link connecting the upstream frame to the downstream frame, the link being arranged in a vertical plane and supporting a weight of the upstream part of the downstream frame; and a base support which is adjustable in height and fixedly attached to the downstream part of the upstream frame, the vertical plane of the at least one link being located at the base support.

2. Device according to claim 1, wherein the at least one link is arranged on a bisectrix of a horizontal angle formed by the two adjacent frames.

3. Device according to claim 2, wherein the link comprises a cylinder extending across a direction along the successive frames; and respective bearings for the cylinder, each of the respective bearings being positioned on one of the two adjacent frames and the cylinder being secured into the bearings.

4. Device according to claim 2, wherein the link is spherically shaped.

5. Device according claim 1, wherein the two adjacent frames are positioned in a horizontal rectilinear arrangement.

6. Device according to claim 3, wherein the bearings are located at both ends of the cylinder.

7. Device according to claim 3, further comprising a tension rod crossing the upstream part of the downstream frame and the cylinder of the link.

8. Device according to claim 7, wherein the tension rod is screwed into the downstream part of the upstream frame, and wherein the tension rod firmly connects the two adjacent frames.

9. An arrangement of successive frames of a machine of production line, the arrangement comprising:

an upstream frame located upstream in the production line;

a downstream frame located downstream in the production line of the upstream frame, the downstream frame having an upstream part extending substantially perpendicularly to the downstream frame towards the upstream frame and the upstream frame having a downstream part extending towards the downstream frame;

at least one link connecting the upstream frame to the downstream frame, the link being arranged in a vertical plane and supporting a weight of the upstream part of the downstream frame; and a base support which is adjustable in height and fixedly attached to the downstream part of the upstream frame, the vertical plane of the at least one link being located at the base support.

10. The arrangement according to claim 9, wherein the at least one link is arranged on a bisectrix of a horizontal angle formed by two adjacent upstream and downstream frames.

11. The arrangement according to claim 10, wherein the at least one link comprises the cylinder extending across a direction along the successive frames; and respective bearings for the cylinder, each of the respective bearings being positioned on one of the two adjacent frames, the cylinder being secured into the respective bearings.

12. The arrangement according to claim 10, wherein the link is spherically shaped.

13. The arrangement according to claim 9, wherein the upstream frame and the downstream frame are positioned in a horizontal rectilinear arrangement.

14. The arrangement according to claim 11, wherein the bearings are located at both ends of the cylinder.

15. The arrangement according to claim 11, further comprising a tension rod crossing the upstream part of the downstream frame and the cylinder of the link.

16. The arrangement according to claim 15, wherein the tension rod is screwed into the downstream part of the upstream frame, and wherein the tension rod firmly connects the two adjacent frames.

* * * * *